United States Patent

Bottum, Jr. et al.

[11] Patent Number: 5,794,611
[45] Date of Patent: Aug. 18, 1998

[54] SOLAR COLLECTOR

[75] Inventors: Edward W. Bottum, Jr.; Edward W. Bottum, Sr., both of Brighton, Mich.

[73] Assignee: Refrigeration Research, Inc., Brighton, Mich.

[21] Appl. No.: 653,335

[22] Filed: May 24, 1996

[51] Int. Cl.⁶ .................................................. F24J 2/24
[52] U.S. Cl. .................. 126/661; 126/658; 126/705; 29/890.033
[58] Field of Search ......................... 126/659, 660, 126/661, 662, 663, 704, 705; 29/890.054, 890.033

[56] References Cited

U.S. PATENT DOCUMENTS

| | | |
|---|---|---|
| Re. 29,737 | 8/1978 | Bottum . |
| 339,309 | 4/1886 | Luddington .................. 126/200 |
| 2,316,191 | 4/1943 | Scott . |
| 3,750,747 | 8/1973 | Hingorany . |
| 4,011,856 | 3/1977 | Gallagher ..................... 126/659 |
| 4,026,272 | 5/1977 | Bottum ........................ 126/661 |
| 4,049,407 | 9/1977 | Bottum . |
| 4,074,406 | 2/1978 | Boyd et al. ................... 126/662 |
| 4,080,956 | 3/1978 | Dawley . |
| 4,120,289 | 10/1978 | Bottum . |
| 4,164,975 | 8/1979 | Bottum . |
| 4,185,615 | 1/1980 | Bottum . |
| 4,215,675 | 8/1980 | Embree ........................ 126/661 |
| 4,294,395 | 10/1981 | Nayar . |
| 4,299,204 | 11/1981 | Cotsworth .................... 126/662 |
| 4,344,415 | 8/1982 | Bottum . |
| 4,554,635 | 11/1985 | Levine ......................... 364/475 |
| 5,098,514 | 3/1992 | Held . |

*Primary Examiner*—Carl D. Price
*Attorney, Agent, or Firm*—William J. Clemens

[57] ABSTRACT

A solar collector includes a copper plate and copper tubes for the collection and harnessing of solar energy. The copper tubes are thermally coupled to the copper plate by a copper alloy fillet. The copper tubes, the copper plate and the copper alloy fillet preferably are brazed in a controlled atmospheric furnace at a temperature in the range from approximately 1700 to about 1800 degrees Fahrenheit. The solar collector includes a housing for the plate and the tubes having two side walls, two end walls, a rear wall and a removable cover closing an open front side of the housing. One of the end walls and each of the side walls have a slot defined therein generally parallel to a plane of the rear wall for releasably receiving the cover which is formed of a glazing material. A solar collector according to this invention provides enhanced thermal conductivities, increased durability and the concomitant advantages associated with improved manufacturing economies.

21 Claims, 3 Drawing Sheets

SOLAR COLLECTOR

BACKGROUND OF THE INVENTION

This invention relates generally to solar collectors and, more particularly, to solar collectors that include copper tubing and a copper plate for the collection and conduction of solar energy.

Solar collectors are used to gather energy from incident sun rays and convert it into useable form. A flat collector plate is typically positioned in a location and orientation in the path of sun rays during daylight hours. The energy present in the sun rays warms the plate as the sun beats down upon it. A fluid filled coil is typically attached to the flat plate such that the heat energy from the warmed plate is transferred to fluid within the coil. Once the fluid is heated, it can be transported to another location where the heat energy can be extracted for various purposes including heating a building structure or providing hot water within a dwelling for example.

One conventional collector includes the use of an aluminum flat plate. Although aluminum is a relatively inexpensive material, it is vulnerable to electrolysis, which results in corrosion of the plate. Therefore, aluminum presents the undesirable drawbacks of limited use time or requiring additional processing steps in order to treat the aluminum in an effort to prevent rapid deterioration.

Other solar collectors have included the use of steel tubes and plates or copper tubes and plates. In such systems the tubes are typically clamped to the plate in order to provide a mechanical connection between the tubes and the plate. Clamping the tubes to the plates results in the shortcoming that heat energy from the plate is not efficiently transferred to the tubes in order to heat the fluid within the tubes.

Another attempt at connecting the tubes to the plate includes using a lead tin alloy to solder the tubes to the plate. Although such soft soldering provides enhanced thermal conductivity compared to a mechanical clamp, it suffers from the drawback of being susceptible to corrosion. The presence of surface moisture is not uncommon in solar collectors and, therefore, the soft solder will likely corrode and the connection between the tubes and the plate will be compromised. A further disadvantage associated with the use of a lead tin alloy soft solder is that such soft solder connections have approximately ⅛ the thermal conductivity of the tubes and plate. This results in a thermal connection between the tubes and the plate that is relatively inefficient.

Previous attempts at improving the thermal conductivity of a connection between the collector tubes and collector plate have not proven effective with copper tubes and copper plates. Because of the conductive and corrosion-resistant qualities of copper, it is desirable to provide a solar collector having a copper plate and copper tubes effectively thermally coupled, which avoids the drawbacks and overcomes the shortcomings described above.

SUMMARY OF THE INVENTION

This invention provides a solar collector device that includes a housing having two side walls and two end walls interconnecting the side walls at opposite longitudinal ends of the side walls and a rear wall extending between the side walls and the end walls closing a rear side of the housing. A cover is connected to the housing at an open front side of the housing to enclose a plurality of tubes within the housing between the rear wall and the cover. The cover is formed of a glazing material permitting solar energy external to the housing to pass through the cover and be incident on the tubes. One of the end walls and each of the side walls has a slot defined therein, the slots extending generally parallel to a plane of the rear side, wherein the cover is received within and releasably retained by the slots for insertion into and removal from the slots at another of the end walls. An upper edge of each of the side walls and the end walls can be bent to form a flange extending about a periphery of the open front side of the housing. A generally L-shaped piece is attached to each of the side walls and the one end wall whereby the flange and the L-shaped pieces form the slots therebetween. Tape is attached to the cover, the side walls and the end walls for sealing the open front side of the housing and retaining the cover in the slots.

The tubes include a plurality of copper tubes thermally coupled to a copper sheet by a copper alloy bond to provide for the conduction of thermal energy from the copper sheet to the copper tubes. The tubes are preferably adapted to contain a fluid that moves through the tubes responsively to the conduction of thermal energy.

The methodology associated with this invention for making a solar collector includes two basic steps. First, a copper tube is placed in contact with the surface on a copper strip. Next, a copper alloy bond is formed along a portion of an outer surface of the copper tube and a portion of the surface of the copper strip. The bond is formed using a copper alloy to thereby thermally couple the copper tube to the copper strip and maintain the tube in a fixed position relative to the strip. The fillet is preferably formed by brazing the copper tube, the copper strip and the copper alloy in an atmospheric controlled furnace at a temperature in the range from approximately 1700 to about 1800 degrees Fahrenheit.

BRIEF DESCRIPTION OF THE DRAWINGS

The above and other advantages of this invention will become readily apparent to those skilled in the art from the following detailed description of the preferred embodiment when considered in light of the accompanying drawings.

DETAILED DESCRIPTION OF THE PREFERRED EMBODIMENT

Figure 1:
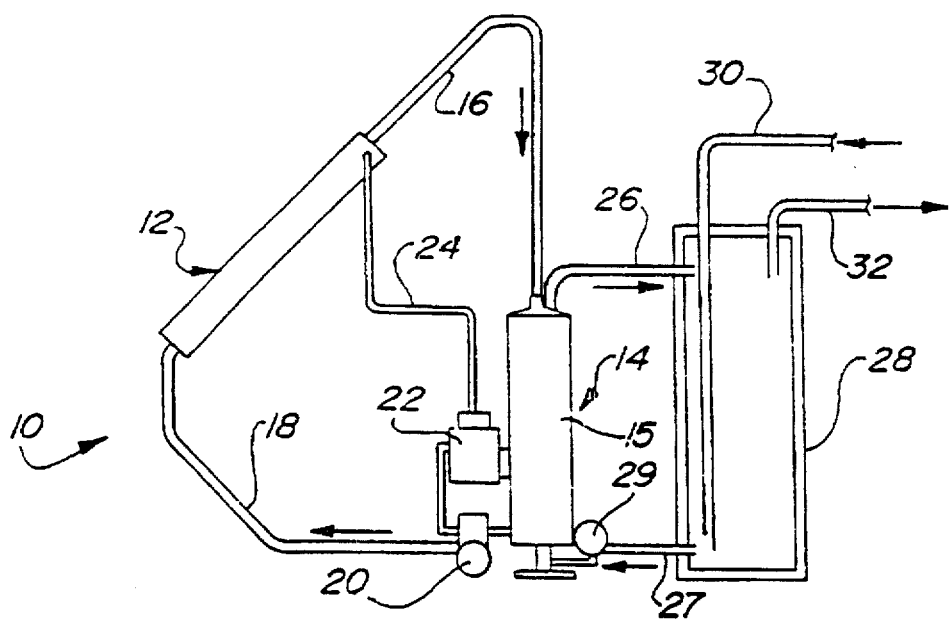
FIG. 1 is a diagrammatic representation of a solar energy system.

FIG. 1 diagrammatically illustrates a solar water heating system 10. The solar water heating system 10 includes a solar collector 12 and a water heating apparatus 14. The water heating apparatus 14 includes several components as described below and is available as a Solar Hydronic Water Heating Package Part No. 5845 from the Solar Research Division of Refrigeration Research, Inc., Brighton, Mich. One of the components of the water heating apparatus 14 is an expansion tank 15 containing a heat exchanger (not shown). Upper ends of the solar collector 12 and the tank 15 are connected through a first fluid line 16 and lower ends are connected through a second fluid line 18. As sun rays are incident upon the solar collector 12, fluid contained within the collector is heated and passes through the first fluid line 16 into a helical heat exchanger tube in the tank 15 which tube is surrounded by water. Heat from the fluid in the heat exchanger tube is transferred to the water in the tank 15 for providing hot water within a dwelling, for example. A first pump 20 of the water heating apparatus 14 is connected to the line 18 to facilitate returning fluid from the heat exchanger tube in the tank 15 to the solar collector 12.

A controller 22 of the water heating apparatus 14 is connected with the solar collector 12 via a sensor line 24. The sensor line 24 can include fluid couplings or electrical wiring in order to provide information via a temperature sensor (included with the apparatus 14) to the controller 22. The controller 22 preferably includes suitable, conventional electronics for monitoring the temperature of the fluid within the collector 12 and responsively controlling the operation of the pump 20, as a particular application may require.

In the illustrated embodiment, a third fluid line 26 is connected to an upper end and a fourth fluid line 27 is connected to a lower end of the expansion tank 15 for circulating water through the tank. The third fluid line 26 is connected to an upper end and the fourth fluid line 27 is connected to a lower end of a conventional insulated water storage tank 28. Water contained within the expansion tank 15 is heated as heated fluid from the solar collector 12 circulates through the heat exchanger tube. A second pump 29 connected to the fourth fluid line 28 circulates the water from the storage tank 28 through the expansion tank 15 and back to the storage tank. Cold water is received into the storage tank 28 through an inlet line 30 connected between the storage tank and a source of water such as a well or a municipal water supply. The cold water is released at the lower end of the storage tank 28 near the open end of the fourth fluid line 28 to be drawn into the expansion tank 15. The heated water flows from the expansion tank 15 into the upper end of the storage tank 28 through the third fluid line 26 near the open end of an outlet line 32 connected between the storage tank and, for example, a building water distribution system. The water heating system 10 shown in the FIG. 1 is only one example of an application for the solar collector 12 designed in accordance with this invention.

Figure 2:
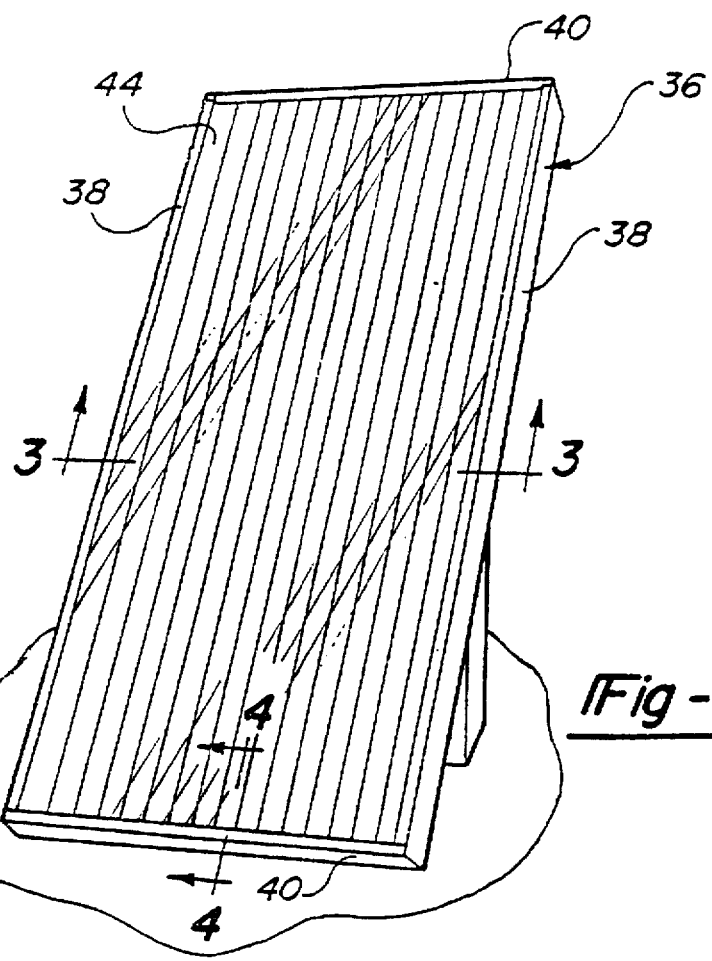
FIG. 2 is a perspective view of a solar collector designed in accordance with this invention.
Figure 3:
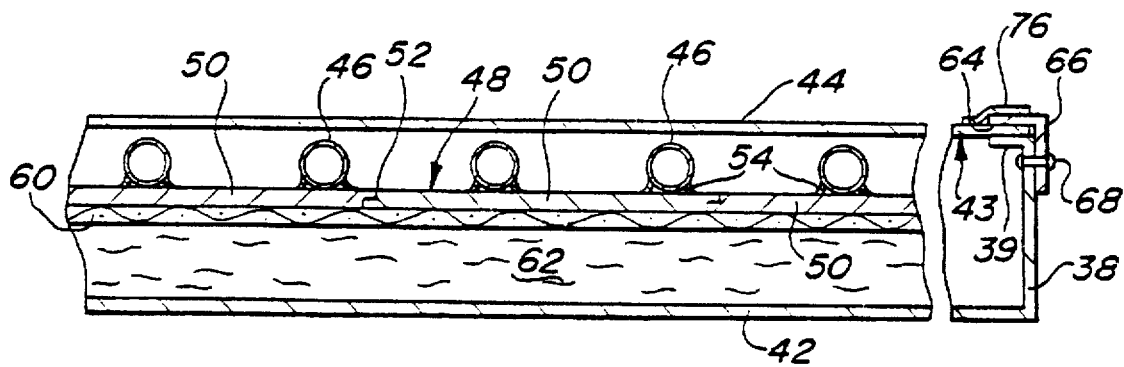
FIG. 3 is a cross-sectional view taken along the line 3—3 of FIG. 2.
Figure 4:
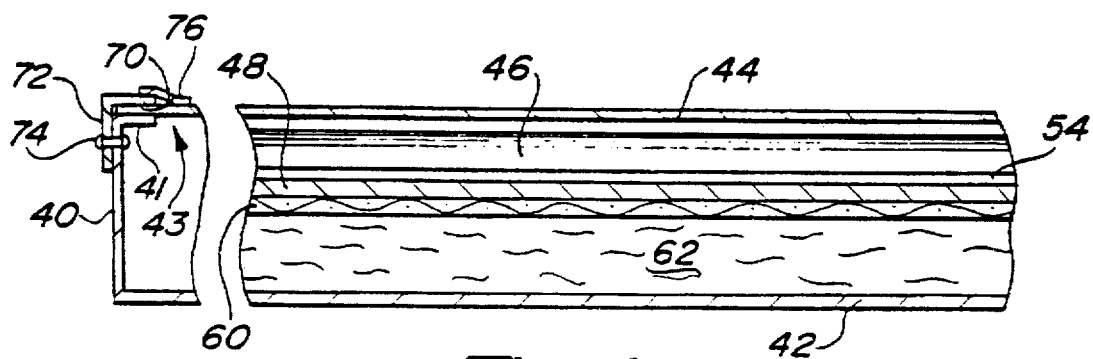
FIG. 4 is a cross-sectional view taken along the line 4—4 of FIG. 2.

The FIGS. 2, 3 and 4 illustrate details of the solar collector 12. The solar collector 12 includes a housing 36, which is preferably made of aluminum. The housing 36 includes a pair of spaced apart upstanding side walls 38 and a pair of spaced apart upstanding end walls 40 which connect the corresponding ends of the side walls respectively. A generally planar rear wall 42 extends between lower edges of the side walls 38 and the end walls 40 to form a closed back or bottom side of the housing 36 (according to the drawings). The rear wall 42, the side walls 38 and the end walls 40 can be formed from a single sheet of material bent to shape. Upper edges 39 of the side walls 38 and upper edges 41 of the end walls 40 are bent inwardly generally parallel to a plane of the rear wall 42 to form a flange surrounding an opening 43 in a front side of the housing 36. A cover 44 is provided to close the opening 43 in the front side of the housing 36 and is supported on the edges 39 and 41 as explained below. The cover 44 is formed of a glazing material, preferably a glass or plexiglass type plastic material. The dimensions of the housing 36 and the cover 44 can be such that the width and length of the cover are standard sizes for window glazing commonly available.

A plurality of copper tubes 46 and a copper plate 48 are disposed within the housing 36 between the rear wall 42 and the cover 44. The copper plate 48 is preferably made of a plurality of copper strips 50 that each extend in a longitudinal direction between the end walls 40 and are attached, in a conventional manner, along adjacent longitudinal edges to form manifold joints 52.

Figure 5:
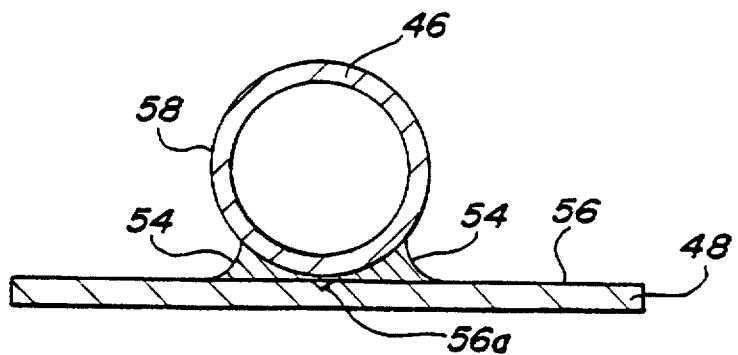
FIG. 5 is an enlarged cross-sectional view illustrating the preferred connection between a copper tube and a copper plate shown in the FIG. 3.

Referring now to the FIGS. 3 through 5, the copper tubes 46 are preferably coupled to the copper plate 48 by a copper alloy bond 54. In the illustrated embodiment, the copper alloy bond is in the form of a fillet 54. Each of the fillets 54 fixedly secures an associated one of the copper tubes 46 to a facing surface 56 of the plate 48. The solar energy that is incident upon the surface 56, which solar energy is converted into thermal energy by the plate 48, is conducted or transferred to the tubes 46. Each of the fillets 54 preferably extends along the entire length of the intersection of an outer surface 58 of the associated copper tube 46 and the adjacent portion of the surface 56 of the copper plate 48. In the most preferred embodiment, as illustrated most particularly in the FIG. 5, the copper alloy fillet 54 extends along the surface 56 and arcuately along an outer surface 58 of the copper tube 46 in a direction away from the intersection between the tube and the copper plate. Thus, a contact region has one side that extends transversely along a longitudinal length of each tube 46 and another side that extends transversely across an arc along the longitudinal length of the outer surface 58 of each tube wherein the fillet extends along each side of the contact region. The increased surface area of the connection provided by the copper alloy fillet 54 increases the cross-sectional surface area of the connection between tube 46 and the plate 48, thereby enhancing the thermal conductivity of the system.

A copper alloy used to form the fillets 54 preferably includes more than 50% copper, by weight. Further, the copper alloy preferably has a melting point at a temperature substantially below 2000 degrees Fahrenheit. The alloy most preferably melts at a temperature in the range from 1700 to approximately 1800 degrees Fahrenheit. Since pure copper melts at 2050 degrees Fahrenheit, such a copper alloy allows for processing in a brazing furnace at a temperature below the melting point of copper, which avoids undesirably distorting the copper plate and tubes during the brazing process.

According to the methodology associated with this invention, it is most preferred to braze the copper tubes 46, the copper plate 48 and the copper alloy fillets 54 in a hydrogen controlled atmospheric furnace. The brazing furnace is most preferably operated at a temperature in the range from about 1700 to approximately 1800 degrees Fahrenheit. Assembling a solar collector in this manner results in a very durable and clean product that advantageously does not require further processing before painting the tubes and plate.

It is most preferred to start with a strip of copper material and run it through rollers to form the strip 50 which is of a width to accommodate at least two of the copper tubes 46. The rollers can, for example, create a guideline for each tube 46 in the form of a small groove or depression 56a extending longitudinally in the surface 56 of the copper strip 50. The copper strip 50 and the tubes 46 preferably are assembled in a fixture with each tube extending along a corresponding one of the grooves 56a. The copper alloy is then placed in position along the intersection between the strip 50 and the tubes 46 and passed through a brazing furnace at a temperature suitable for melting the copper alloy. Multiple ones of the copper strips 50 can then be assembled as illustrated to form a collector plate of any desired surface area. Once the plate 48 is assembled, the copper tubes 46 should be fluidly coupled in parallel.

Figure 6:
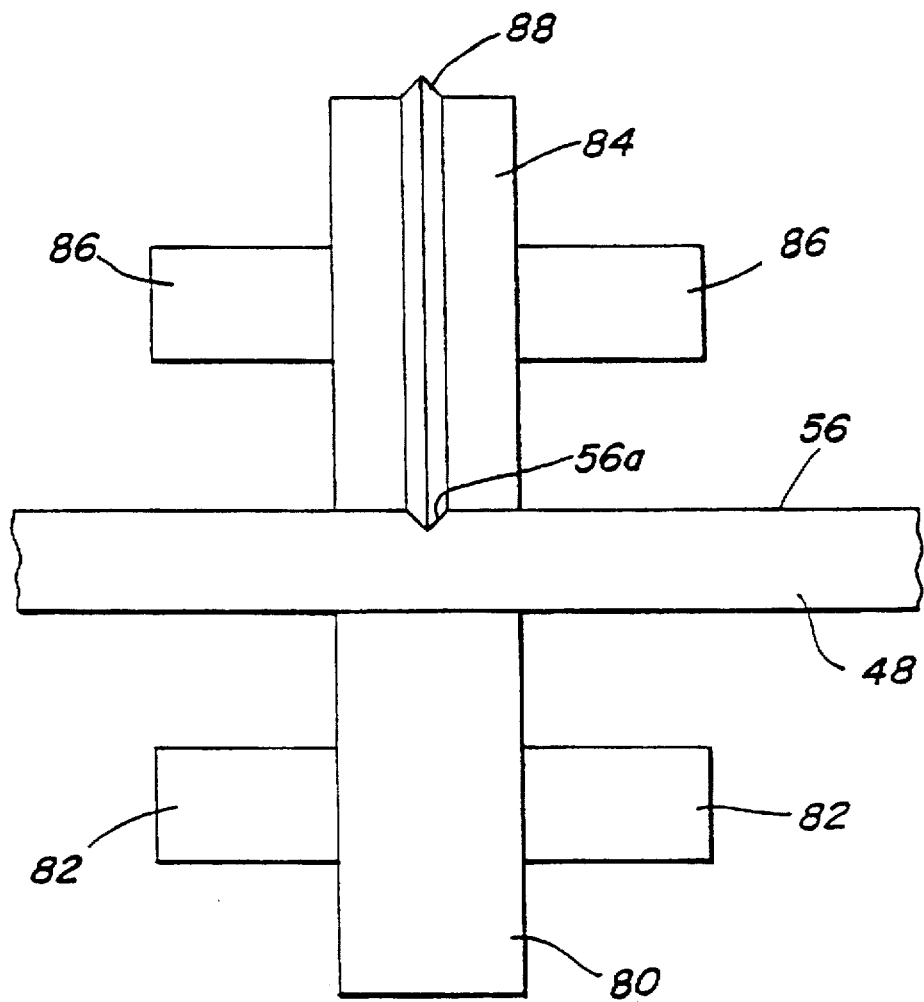
FIG. 6 is a fragmentary front elevation view of the sheet shown in the FIG. 5 being rolled to form the guide line.

There is shown in the FIG. 6 the copper plate 48 inserted between a pair of rollers for forming the groove 56a in the surface 56. A lower roller 80 is rotatably supported on an axle 82. An upper roller 84 is rotatably supported on another axle 86. The upper roller 84 has an annular flange 88 formed thereon in the shape of the groove 56a. The spacing between the rollers 80 and 84 corresponds to the thickness of the plate 48 such that as the plate is fed between the rollers, or as the rollers are rolled across opposite surfaces of the plate, the flange 88 forms the groove 56a in the surface 56.

Attaching the copper tubes 46 to the plate 48 using a high copper alloy bond 54 provides significant advantages including better heat transfer between the plate and the tubes. Further, the mechanical bond between the plate 48 and the tubes 46 is essentially unaffected by moisture and, therefore, indestructible with normal use over extended periods of time. Further, the finished plate does not require extensive cleaning with acid as is required with prior art soft solder connections. This invention, therefore, provides a more simple and efficient production process that results in a better product because the copper tubes 46 and the copper strips 50 can be brazed in a controlled atmospheric furnace.

In the embodiment illustrated in the FIGS. 3 and 4, the strips 50 of the copper collector plate 48 preferably are mounted into headers (not shown) and placed within the housing 36. A layer of wire mesh 60 preferably is disposed over a layer of insulation 62 within the housing 36 on the panel 42 to provide an insulated box that houses copper collector plate 48 and the tubes 46. Two layers of 1.5 inch unbounded and unlubricated fiberglass insulation, available from Owens Corning, placed under and around the collector plate 48 have proven effective. The collector plate 48, the copper tubes 46, the wire mesh 60 and any exposed insulation 62 preferably are coated with a layer of commercially available primer paint followed by one coat of RR5909 Microsorb collector coating material, which is available from Solar Research, Brighton, Mich.

As shown in the FIG. 3, the side walls 38 preferably include longitudinally extending slots 64 that receive side edges of the cover 44. The slots 64 allow a user to insert the cover 44 from one end of the housing 36 as described below and slide it along the edges 39 until the cover is in the position illustrated in the FIG. 2. The slots 64 can be formed by connecting an L-shaped piece 66 to each of the side walls 38, using a fastener 68, which may be a rivet or bolt, as illustrated. Alternatively, each of the side walls 38 can be formed out of a single piece of aluminum that is molded or shaped to provide the slot 64.

As illustrated in the FIG. 4, an end wall slot 70 is provided in one of the end walls 40 (the bottom end wall according to the FIG. 2) in order to receive and maintain one end of the cover 44 in position for closing the opening 43 in the front side of the housing 36. The slot 70 can be formed by connecting an L-shaped piece 72 to the one end walls 40, using a fastener 74, which may be a rivet or bolt, as illustrated. Although not illustrated, a transversely extending support rod can be provided within the housing 12 to support the cover 44 at a central point between the end walls 40. The support rod is preferably an aluminum rod that is insulated with a material such as a fiberglass tube covering the entire aluminum rod. Since there is no L-shaped piece attached to the top end wall 40, the cover 44 can be inserted into the open ends of the slots 64 until a bottom edge of the cover is received by the slot 70. Now the edges of the cover 44 are supported by the flange formed by the edges 39 and 41 of the side walls 38 and end walls 40 respectively. The cover 44 can be sealed to the housing 36 by applying a tape material 76 along the area of the slots 64, the slot 70 and the upper end wall 40. Accordingly, the solar collector 12 designed in accordance with this invention enables a user to replace or repair the cover 44 in a relatively easy manner by removing the tape 76, sliding the cover in the slots 64 to remove the cover, inserting a new or repaired cover and resealing with tape.

In accordance with the provisions of the patent statutes, this invention has been described in what is considered to represent its preferred embodiment. It should be noted, however, that the above description is exemplary rather than limiting in nature. Various modifications to the described embodiment are possible for practicing this invention without departing from its spirit or scope.

What is claimed is:

1. A solar collector device comprising:

a housing having two side walls and two end walls interconnecting said side walls at opposite longitudinal ends of said side walls, and a rear wall extending between said side walls and said end walls closing a rear side of said housing, one of said end walls and each of said side walls having a slot defined therein, said slots extending generally parallel to a plane of said rear wall, another of said end walls terminating adjacent an open end of each of said slots in said side walls;

a means for gathering incident solar energy mounted in said housing; and a cover connected to said housing at an open front side of said housing to enclose said means for gathering incident solar energy between said rear wall and said cover, said cover being formed of a glazing material permitting solar energy external to said housing to pass through said cover and be incident on said means for gathering, wherein said cover is received within and releasably 1–8, 10–17 and retained by said slots for insertion into and removal from said slots at said open ends adjacent said another of said end walls.

2. The device of claim 1 including tape attached to said cover, said side walls and said end walls for sealing said open front side of said housing and retaining said cover in said slots.

3. The device of claim 1 wherein said means for gathering incident solar energy includes:

a copper plate for collecting incident solar energy;

a plurality of copper tubes coupled to said plate such that solar energy collected by said plate is conducted to said tubes, said tubes being adapted to contain fluid that moves through said tubes in response to the solar energy being conducted to said tubes from said plate; and a copper alloy fillet conductively coupling said tubes to said plate and fixing said tubes relative to said plate.

4. The device of claim 3 wherein said fillet comprises a copper alloy that has a melting point at a temperature in the range from approximately 1700 to about 1800 degrees Fahrenheit.

5. The device of claim 3 wherein said tubes are in facing engagement with a surface on said plate along an intersection between an arcuate portion of an outer surface on said tubes and an adjacent portion of said surface on said plate and wherein said fillet extends along each side of said intersection and extends outwardly along said surface on said plate and arcuately along said outer surface on said tubes in a direction away from said intersection.

6. A solar collector device comprising:

a housing having two side walls and two end walls interconnecting said side walls at opposite longitudinal ends of said side walls, and a rear wall extending between said side walls and said end walls and closing a rear side of said housing, said side walls and one of said end walls each including a slot extending generally parallel to a plane of said rear wall, another of said end walls terminating adjacent an open end of each of said slots in said side walls;

a copper plate disposed within said housing;

a plurality of copper tubes thermally coupled to said plate by a copper alloy bond for conduction of thermal energy from said plate to said tubes, said tubes being adapted to contain fluid that moves through said tubes responsively to said conduction of thermal energy; and a cover releasably connected to said housing at an open front side of said housing to enclose said plate and said plurality of tubes within said housing between said panel and said cover, said cover being formed of a glazing material permitting solar energy external of to said housing to pass through said cover and be incident on said plate and said tubes, wherein said cover is received within and releasably retained by said slots for insertion into and removal from said slots at said open ends adjacent said another said end walls.

7. The device of claim 1 wherein said copper alloy bond comprises a brazed copper alloy fillet.

8. The device of claim 1 wherein said copper alloy bond comprises a copper alloy having a melting temperature substantially lower than 2000 degrees Fahrenheit.

9. The device of claim 1 wherein said copper alloy bond comprises a copper alloy having a melting temperature in a range from approximately 1700 to about 1800 degrees Fahrenheit.

10. The device of claim 1 wherein said copper alloy bond is formed from a copper alloy comprising at least 50% copper by weight.

11. The device of claim 1 wherein each of said plurality of tubes is bonded to a surface of said plate along an intersection between said plate and an outer surface on each said tube, said intersection having a longitudinal length and said bond extending along all of said length.

12. The device of claim 1 wherein each of said plurality of tubes is bonded to a surface of said plate along an intersection of said tubes and said plate that is defined by a contact region having one side extending transversely to and along a longitudinal length of each said tube and another side extending transversely to across an arc and longitudinally along an outer surface of each said tube and wherein said bond comprises a copper alloy fillet that extends along each side of said contact region.

13. The device of claim 1 wherein said plate comprises a plurality of copper strips each having at least one of said plurality of tubes bonded thereto and wherein said strips are assembled side by side longitudinally to form said plate.

14. The device of claim 1 including tape attached to said cover, said side walls and said end walls for sealing said open front side of said housing and retaining said cover in said slots.

15. The device of claim 1 wherein an upper edge of each of said side walls and said end walls is bent to form a flange extending about a periphery of said open front side and including a generally L-shaped piece attached to each of said side walls and said one end wall, said flange and said L-shaped pieces forming said slots therebetween.

16. A method of making a solar collector having copper tubes thermally coupled to a copper plate comprising the steps of:

(A) rolling a copper strip to thereby form a guide line along a surface of the copper strip and placing a copper tube along the guide line in contact with the surface of the copper strip; and (B) forming a copper alloy bond along a portion of an outer surface of the copper tube and a portion of the surface of the copper strip, to thereby thermally couple the copper tube to the copper strip and maintain the copper tube in a fixed position relative to the copper strip.

17. The method of claim 16 wherein the guide line is formed by the substep of forming a longitudinal depression in the surface of the copper strip.

18. The method of claim 16 wherein the step (B) is performed by the substeps of:

disposing the copper alloy along the portion of the surface of the copper strip adjacent the copper tube; and melting the copper alloy such that the melted copper alloy forms a fillet that extends along the portion of the surface of the copper strip and along the portion of the outer surface of the copper tube in a direction away from a line of contact between the copper tube and the copper strip.

19. The method of claim 18 wherein the step (B) is performed by the further substeps of brazing the copper tube, the copper strip and the copper alloy in an atmospheric controlled furnace.

20. The method of claim 19 wherein the step (B) is performed by the further substep of maintaining a temperature within the furnace in the range from approximately 1700 to about 1800 degrees Fahrenheit.

21. The method of claim 16 further comprising the steps of:

(C) performing the steps (A) and (B) to make a plurality of the copper strips each having at least one copper tube connected thereto;

(D) connecting the plurality of copper strips together in side by side relationship to thereby form a copper plate having a plurality of the copper tubes connected thereto; and (E) coupling the plurality of copper tubes together to allow fluid to pass through the copper tubes.

* * * * *